Dec. 17, 1957 O. C. HALL 2,817,017

FREQUENCY SHIFT KEYED OSCILLATORS

Filed Aug. 12, 1955

INVENTOR
ORVILLE C. HALL

BY George Sipkin
B. L. Zangwill
ATTORNEYS

United States Patent Office 2,817,017

Patented Dec. 17, 1957

2,817,017

FREQUENCY SHIFT KEYED OSCILLATORS

Orville C. Hall, Baltimore, Md., assignor, by mesne assignments, to the United States of America as represented by the Secretary of the Navy Application August 12, 1955, Serial No. 528,138

11 Claims. (Cl. 250—36)

This invention relates to frequency-modulated oscillator generator and components therefor, but in some respects it has broader aspects. More particularly, the invention is directed to improvements in frequency shift keyed oscillator generating means utilizing keyed reactance tube means for frequency shift.

The generating means of a frequency shift keyed communication system frequently comprises an oscillator, the frequency of which is changed, for signalling purposes, from one value to another by a predetermined variation in the effective reactance of the frequency determining circuit of the oscillator. The variation is obtained by deliberately changing the gain of a reactance tube, or the equivalent, connected to the oscillator frequency-determining circuit; the change in gain reflecting itself as a change in reactance of the circuit. However, the gain of a reactance tube is also influenced by certain parameters of the equipment, such as for example, undesired variations in filament voltage and in plate voltage for a triode (or in screen voltage for a pentode) which cause the oscillations to drift or be at frequencies removed from the assigned frequencies. To minimize deviation of frequency so as to stabilize the operation of the oscillator generator, it is desirable to keep these voltages constant, or to provide circuitry in which such changes in these voltages do not significantly affect the gain of the reactance tube.

An object of the invention is to provide a frequency shift keyed oscillator generator with tube control which will continuously operate on its assigned frequencies within extremely close tolerances, so that the oscillations are extremely stable and accurate.

Another object of the invention is to provide a frequency shift keyed oscillator generator comprising an oscillator controlled by a reactance tube having its control grid controlled by a tube amplifier, the reactance tube acting as a buffer between the oscillator and amplifier.

In accordance with the preferred form of the invention, a stable oscillator of any suitable conventional form is used with a reactance tube means that comprises an amplifier. A sample of the oscillator voltage is applied to the amplifier and is then returned to the oscillator as feedback after being shifted 90° in phase in one direction or the other, depending on the keying polarity. The amplifier is stabilized against filament voltage variations by having a constant gain except for control grid variations at a tube of the amplifier at which keying is accomplished.

Other objects and many of the attendant advantages of this invention will be readily appreciated as the same becomes better understood by reference to the following detailed description when considered in connection with the accompanying drawings wherein.

Figure 1:
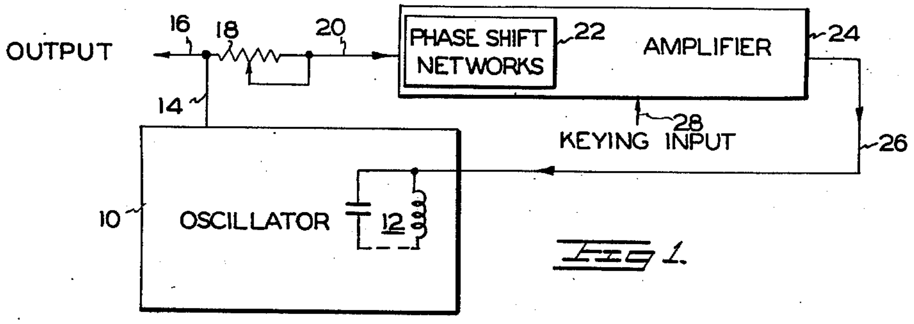
Fig. 1 is a schematic diagram for illustrating principles of frequency shift keying for the invention.

Referring to Fig. 1, an oscillator 10 is provided which may be, for example, a Clapp or other oscillator known to the art as a highly stable oscillator. The oscillator includes a frequency determining tank circuit represented in this figure by the reference numeral 12. The oscillator 10 has an output connection 14 connected to the frequency shift keyed output lead 16.

A sample of the output voltage of the oscillator 10 is taken from the output connection 14, through a resistor 18 and conductor 20, and is applied to one or more phase shift networks 22 of an amplifier 24 which feeds back, via conductor 26, to the tank circuit 12 of the oscillator for reactance control. Keying is accomplished through conductor 28 which selectively applies a negative or a positive control voltage to a control grid of a tube of the amplifier. The keying is done at the amplifier and by providing a stabilized amplifier, extremely stable operation is obtained.

In accordance with the invention, the phase shift of 90° for reactance control is accomplished in two steps, preferably of 45° each, one at the input to the amplifier and another subsequently. A balanced tube arrangement for added stability is provided between the phase shifting steps. A circuit of this nature is disclosed in Fig. 2.

Figure 2:
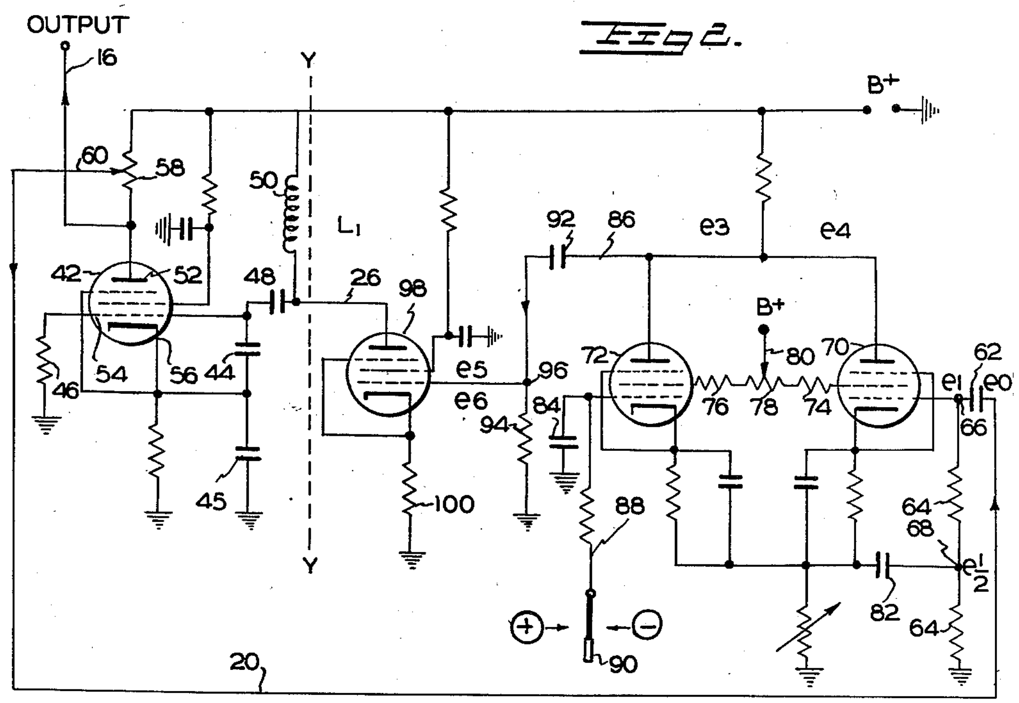
Fig. 2 is a detailed circuit diagram of a preferred embodiment of the invention.
Figure 3:
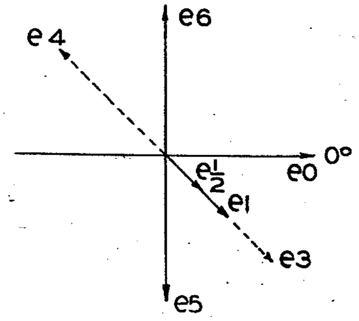
Fig. 3 is a diagram, in vector form, of certain voltage phase relationships in the circuit of the preferred embodiment.

Referring to Fig. 2, the equipment to the left of broken line Y—Y represents a Clapp oscillator comprising an oscillator tube 42, preferably a pentode, having a feedback circuit comprising relatively large capacitors 44 and 45 and grid leak resistor 46. The tube 42 has a second feedback frequency-determining circuit comprising capacitor 48 and inductor or inductance 50. The oscillator tube 42 comprises an anode 52, control grid 54 and cathode 56. The oscillator has an output lead 16 connected to the anode 52, and an input lead 26 connected to a junction connection of the capacitor 48 and inductor 50.

In accordance with the invention a variable resistor 58, of a relatively high resistance, is connected in the circuit-branch supplying anode 52 with a stable regulated plate voltage (B+).

The resistor 58 is in the plate circuit of the oscillator tube 42; and since the conditions for oscillation in the circuit are a function of tube conductance which is dependent on screen voltage, the resistor 58 has negligible effect on the oscillator. The voltage developed across the resistor is essentially electron coupled. An adjustable arm tap 60 of the resistor 58 provides any desired sample or fraction of the oscillator voltage on conductor 20. This sample voltage or signal is represented as having a value of $e0$ and is chosen as a reference or zero axis for voltage phase relationships subsequently described.

The signal $e0$ is applied across a phase shift network comprising a capacitor 62 and a resistor 64, having a junction point 66. The resistor 64 has a center point 68 for a tap so that the voltages across each half of the resistor are equal in magnitude.

The network is such that a voltage or signal $e1$ is obtained at junction point 66 that is shifted 45° from $e0$. The signal $e\frac{1}{2}$ at point 68 is, accordingly, in phase with $e1$.

The signal $e1$ is fed into a tube circuit arrangement that includes pentode tubes 70 and 72 connected to make up a variable reactance amplifier in a balanced push-pull arrangement with sufficient voltage feedback to give gain stabilization. To this end, the screen grids of tubes 70 and 72 are connected by a resistive circuit including unbypassed resistors 74 and 76 and a central resistor 78 having an adjustable tap arm 80 to which a biasing voltage B+ is connected.

The tubes 70 and 72 are connected so that one-half of the signal $e1$ is applied across the grid and cathode of tube 70, and the other half across the cathode and grid of tube 72. The connection places the output voltages $e4$ and $e3$ of the tubes 70 and 72, respectively, in opposite phase. To this end, the center point 68 is connected to the cathode of tube 72 through a capacitor 82 to apply the signal $e½$ to the cathode. The capacitor 82 is solely a blocking capacitor and does not produce any significant phase shift. The control grid of tube 72 is bypassed to the operating frequency by capacitor 84. To apply an equivalent signal to tube 70, the junction point 66 is connected to the control grid of tube 70 and the center point 68 is also applied to the cathode of the tube 70, through blocking capacitor 82. The anodes of the tubes 70 and 72 are connected together and to an output conductor 86.

Since the signals $e3$ and $e4$ appearing on the anodes of tubes 70 and 72 are 180° out of phase, then with the tubes balanced and anodes tied together, the net signal on conductor 86 is zero on the equipment thus far described, corresponding to carrier position and no shift. By introducing keying to the control grid of tube 72, the balance is upset to produce a signal on the conductor 86. If a positive voltage is applied to the grid, the output signal will be $e3$ because tube 72 will predominate over tube 70; but if a negative voltage is applied to the grid, the tube 70 will predominate and the output signal will be $e4$.

For keying purposes, a keying circuit 88 is connected to the grid of tube 72, and diagrammatically comprises a three-position keying switch 90 for applying a positive or a negative potential to the grid. The switch has a neutral position for initial balancing purposes and for carrier frequency.

The signals $e3$ and $e4$ being 180° out of phase, they can be used for reactance control. However, they must be shifted another 45° in order to bring them in quadrature with the oscillator voltage $e0$. Consequently, the output conductor 86 feeds into a second 45° phase shift network comprising capacitor 92 and resistor 94 joined by a conductor 96 from which the shifted signal is taken for application to the oscillator tank circuit through a reactance pentode tube 98. The tube 98 operates as a class A amplifier and functions as a buffer amplifier for introduction of the reactance voltage to the tank circuit of the oscillator tube 42. To this end, the anode of tube 98 is connected by conductor 26 to the junction of capacitor 48 and inductor 50, and the control grid of the tube is connected to the conductor 96. The final result of the phase shift loops is then to give a full 90° shift from the oscillator voltage, and provides, on conductor 96, voltages $e5$ and $e6$ associated, respectively, with signals $e3$ and $e4$. Through the keying stage, a phase shift of +90° or −90° can be selected. The oscillator frequency will shift above or below the carrier frequency depending on the selection of the polarity of the keying signal.

The operation of the push-pull phase selector-amplifier comprising tubes 70 and 72 is such that the 90° signal that is returned to the oscillator is always a difference signal. This effect results in a more constant over-all gain for the amplifier since any change in gain for either tube has a similar effect on the other one, causing the difference voltage output to remain unchanged.

The buffer-amplifier tube 98 has an unbypassed cathode resistor 100 to neutralize the effect of the presence of oscillator voltage on its anode. The plate resistance of the pentode is sufficiently high to make any tank circuit loading effect negligible. Consequently, since the gain of the tube 98 does not change, there is no change of loading effect or frequency change because of this tube. Furthermore, the tube neutralization resulting from the unbypassed cathode resistor allows large changes in filament and in supply voltages with no change in oscillator frequency.

The results of this circuit are such that a highly stable frequency shift keyed oscillator generator is obtained and is practically unaffected by wide variations of filament and B supply voltage changes. The circuit is also well suited to frequency shift keying where a constant deviation either side of the carrier is desired. For this condition of operation, a fixed keying signal is applied and the amount of deviation desired is adjustable by the setting of arm tap 60 on resistor 58. For facsimile operation, where a frequency deviation as a function of keying voltage amplitude is desired, the maximum deviation desired is set by adjusting arm tap 68, and a keying signal varying in amplitude is applied to the grid of the keyer tube 72. Since zero keying voltage is the carrier position, changing the amount of deviation has no effect on carrier frequency. The use of two 45° phase shift networks, rather than trying to obtain the 90° phase shift with one RC circuit, allows an exact setting for phase shift which results in no amplitude modulation of oscillator output under conditions of frequency shift.

If a limited shift is desired, tube 70 or 72 can be eliminated and a +90° signal or a −90° signal can be obtained which will allow frequency shift on one side of the oscillator frequency. If it is desirable to use a keying signal of one polarity (O to $+E$), the grid of tube 70 can be biased positive by a voltage E/2 and a single polarity keying signal can be used. The carrier position is then obtained with a voltage of +E/2 on the grid of tube 72.

Obviously many modifications and variations of the present invention are possible in the light of the above teachings. It is therefor to be understood that within the scope of the appended claims the invention may be practiced otherwise than as specifically described.

What is claimed is:

1. An oscillator generator comprising an oscillator having a frequency-determining circuit, a first phase-shift network, means for applying a portion of the voltage of said oscillator to said network, reactance tube means comprising a push-pull amplifier having an output, connections from said network to said amplifier to provide balanced and oppositely phased output voltages in said amplifier, means for upsetting the balance of said voltages, a second phase-shift network, means connecting the output of said amplifier to said second network, and connections from said second network to said frequency determining circuit, the total phase-shift of said first and second networks being 90° whereby said amplifier output is applied to said circuit in quadrature to the oscillator voltage.

2. An oscillator generator comprising an oscillator having a frequency-determining circuit; a push-pull amplifier comprising an output and a pair of tubes connected to said output, and biasing means biasing said tubes to make a pair of equal voltages available on said output, said voltages being 180° apart but phase displaced from the oscillator voltage; means operable for changing the magnitude of either of said voltages as compared to the other; and circuit means connecting said output to said frequency-determining circuit, said circuit means including phase-shifting means for shifting the amplifier output to place the voltage on said output in quadrature with the oscillator voltage.

3. An oscillator generator comprising an oscillator having a frequency-determining circuit; a push-pull amplifier comprising an output and a pair of tubes connected to said output, resistance coupling means between said tubes, and biasing means biasing said tubes to make a pair of voltages available on said output, said voltages being 180° apart; means operable for changing the magnitude of either of said voltages as compared to the other; a buffer tube; circuit means comprising a phase-shifting network connecting the control grid of said buffer tube to said output; and means connecting the anode of said buffer tube to said frequency-determining circuit, whereby the voltage on said amplifier-output is applied to said oscillator.

4. An oscillator generator comprising an oscillator having a frequency-determining circuit; a push-pull amplifier comprising an output and a pair of tubes connected to said output, resistance coupling means between said tubes, and biasing means biasing said tubes to make a pair of voltages available on said output, said voltages being 180° apart; means operable for changing the magnitude of either of said voltages as compared to the other; a buffer tube; and circuit means connecting said buffer tube to said output and to said frequency-determining circuit, whereby the voltage on said amplifier-output is applied to said oscillator, said circuit means comprising a phase-shifting network between said buffer tube and said amplifier; said buffer tube having a resistor in its cathode circuit; said amplifier having an input; and means for applying a fraction of the oscillation voltage to said input.

5. An oscillator generator as defined in claim 4 but further characterized by the last said means comprising a phase-shifting network.

6. An oscillator generator comprising an oscillator having a frequency-determining circuit, a balanced push-pull amplifier comprising an input, an output, and push-pull tubes therebetween, resistance coupling means between said tubes comprising a common anode voltage supply, first circuit means connecting said input to said oscillator, biasing means reversely biasing the control grids and cathodes of said tubes, a buffer amplifier having an input and output, second circuit means connecting said buffer input to said push-pull amplifier output, and third circuit means connecting said buffer output to said frequency-determining circuit.

7. An oscillator generator as defined in claim 6 but further characterized by said first circuit means comprising a phase-shift network.

8. An oscillator generator as defined in claim 7 but further characterized by said second circuit means comprising a phase-shift network, said phase-shift networks providing, together, a 90° phase shift.

9. An oscillator generator comprising an oscillator having a frequency-determining circuit, a push-pull amplifier comprising an output and a pair of tubes connected to said output, means for obtaining a portion of the output of said oscillator, means for shifting said portion through a first phase angle of less than 90°, divider means for dividing said shifted portion into two parts and applying a first part to the grid of a first of said tubes, and the second part to the grid of the second of said tubes but with said parts in phase opposition, circuit means for applying the output of said amplifier to said oscillator, the last said means including a phase shifting circuit for shifting the output through an angle which is complementary to said first phase angle, and separate means independently to control the output of a first of said tubes.

10. An oscillator generator as defined in claim 9 but further characterized by said circuit means comprising a buffer tube.

11. An oscillator generator as defined in claim 10 but further characterized by said divider means comprising means making said two parts equal.

References Cited in the file of this patent

UNITED STATES PATENTS

| | | |
|---|---|---|
| 2,572,512 | Pappenfus | Oct. 23, 1951 |
| 2,349,811 | Crosby | May 30, 1955 |